May 30, 1933.  R. S. A. DOUGHERTY ET AL  1,911,493

GEAR ENTRAINING MECHANISM

Filed May 12, 1931  3 Sheets-Sheet 1

Inventors
R. S. A. Dougherty
and Earl J. Miller.
By R. S. A. Dougherty.
Attorney

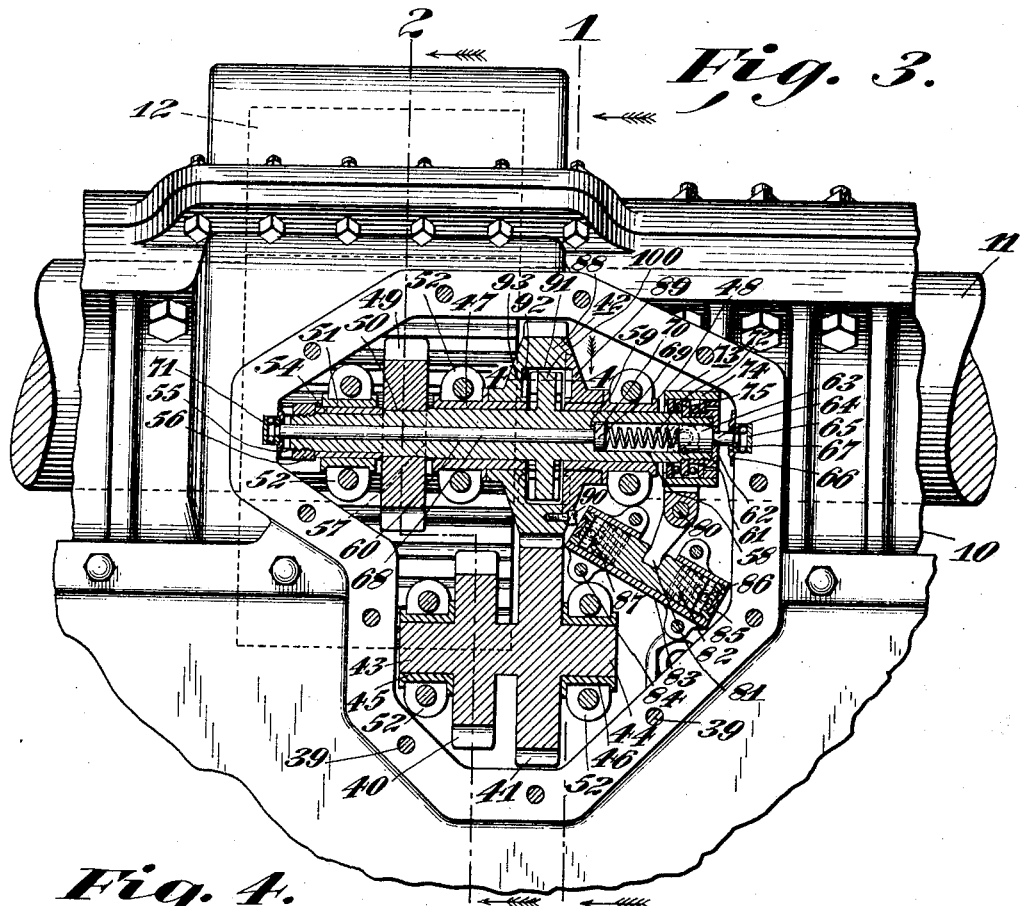

May 30, 1933.  R. S. A. DOUGHERTY ET AL  1,911,493
GEAR ENTRAINING MECHANISM
Filed May 12, 1931  3 Sheets-Sheet 3
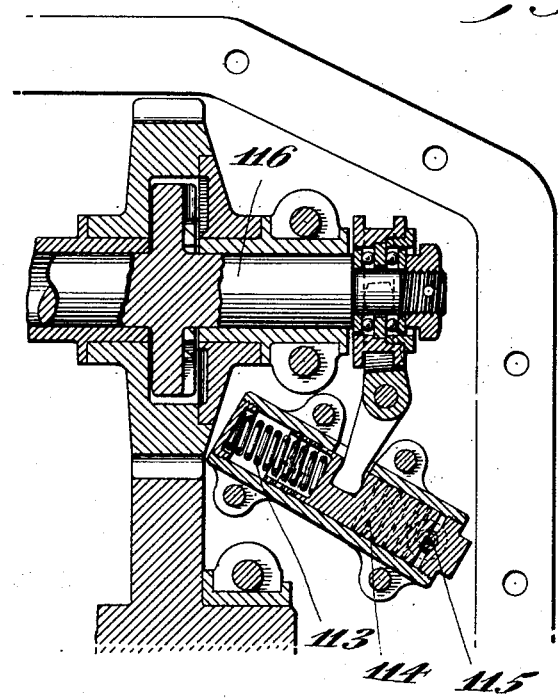
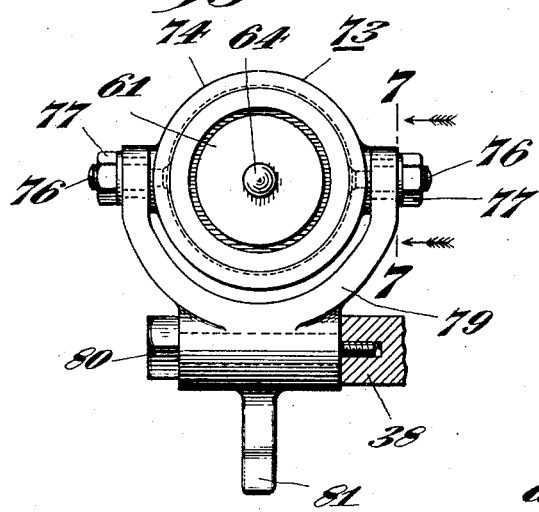
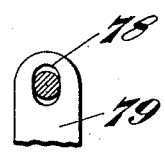
Inventors
R. S. A. Dougherty
and Earl J. Miller
By R. S. C. Dougherty
Attorney Patented May 30, 1933

1,911,493

UNITED STATES PATENT OFFICE

ROBERT S. A. DOUGHERTY AND EARL J. MILLER, OF BETHLEHEM, PENNSYLVANIA, ASSIGNORS TO BETHLEHEM STEEL COMPANY, A CORPORATION OF PENNSYLVANIA

GEAR ENTRAINING MECHANISM

Application filed May 12, 1931. Serial No. 536,752.

This invention relates to an improved gear entrainment mechanism and has for its primary object to provide for automatic and positive positioning means for entraining driving and driven gears with each other in a manner which will prevent clashing and for automatically disconnecting the gears when the driving force of the driving gear is discontinued. The said positioning means being electively operable for either direction of rotation of the driven gears when the driving gears are of a reversible type, or electively operable for the chosen direction when the driving gears are of a one-way type.

Another object is to provide a mechanism comprising reversible driving and driven trains, which is characterized by the fact that the means for effecting the entrainment is elective as regards the direction of rotation of the driving means but the actual entrainment is operatively controlled and actuated by the driving train to establish and constantly maintain such entrainment during the operation of the driving train in order to provide an uninterrupted transmission of power from the driving train to the driven train in a predetermined direction of rotation.

Another object is to provide a gear entrainment mechanism having a driving train, a driven train, a synchronizing train which is responsive to the operation of the driving mechanism to effect a torque reaction between the driving and the driven trains effective to move the actuating gear of the driving train into engagement with the gear of the driven train and to break the torque engagement of the transmission train upon the engagement of the driving and driven members, and means to render ineffective the responsiveness of the synchronizing train to effect the torque reaction between the driving and the driven trains.

A further object is to provide a reversible gear entrainment mechanism having a driving train, a driven train, and a synchronizing train which is responsive to the operation of the driving mechanism to effect a torque reaction of predetermined direction between the driving and the driven trains effective to move the actuating gear of the driving train into engagement with the gear of the driven train and to break the torque engagement of the synchronizing train upon the engagement of the driving and driven members.

Our invention may be used for establishing connection between driving and driven gears in mechanisms of different forms, such as starting internal combustion engines or similar devices having a single direction of rotation, but it finds its particular advantage when used for entraining the gears of a reversible auxiliary locomotive or the like, and for illustrating it is this last mentioned application which we have chosen to describe as the preferred form of our device.

The novel features will be more fully understood from the following description and claims taken with the drawings in which:

Fig. 3 is an enlarged view of that part of a reversible auxiliary locomotive wherein is installed our invention, and is shown with the entrainment device cover removed along the line 3—3 of Fig. 1;

Fig. 4 is an enlarged cross section in part showing the relation and construction of the synchronizing clutch taken along the line 4—4 in the direction of the arrow of Fig. 3;

Fig. 5 is an enlarged cross sectional view showing a modification of our device for entraining gears having only one direction of rotation;

Fig. 6 is an enlarged end elevation showing the clutch shifting lever shown in Figs. 1 and 3, and Fig. 7 is a detail of the clutch shifting lever of Fig. 6 taken along the line 7—7.

Figure 1:
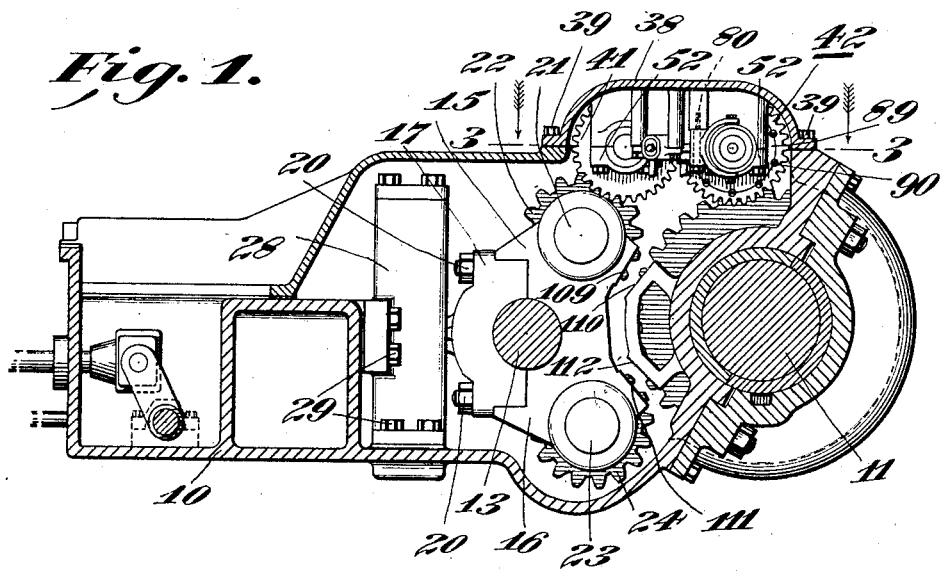
Fig. 1 is a longitudinal sectional elevation in part of a reversible auxiliary locomotive taken along the line 1—1 of Fig. 3 showing the application and relation of the entraining mechanism according to our invention.

As heretofore stated, the present invention is primarily designed for the purpose of entraining a reversible auxiliary propulsion motor for a locomotive with a normally idle truck axle, or one driven at insufficient speed, whereby the tractive effort of the main locomotive may be supplemented at low speeds.

It is, of course also important that when the aid of this reversible auxiliary motor is no longer desired, that it shall be automatically disentrained from the truck axle. However, as will appear from the following description, the present invention is not necessarily restricted to this particular application thereof, but may be readily applied in various other cases to automatically entrain and disentrain a power actuated driving shaft (reversible or one-way) with or from a shaft to be driven thereby.

As illustrated in the accompanying drawings, we have shown a portion of a suitably constructed frame 10 upon which the parts of the reversible auxiliary propulsion motor (not shown) are mounted. Any preferred means may be employed for supporting this motor carrying frame with relation to the truck frame between the spaced wheel axles of the truck, one of which we indicated at 11. This axle has fixed thereon a gear wheel 12, which we designate as the driven gear.

The crank shaft 13 actuated through the medium of suitable connection with the propulsion motor is journaled in suitable spaced bearings on the frame 10, and this shaft has fixed thereon the driving gear 14 spaced from and out of meshing relation to the gear 12 on the axle 11.

About the crank shaft 13 is rotatably mounted a rocker bracket 15. This bracket is in the form of a yoke having spaced sides 16 arranged respectively on the opposite ends of the driving gear 14 and is assembled upon the crank shaft 13 by means of the bearing cap 17. The sides 16 are joined at the front mid portion by the cross-tie member 18, thereby making the sides integral. The bearing cap 17 also is in the form of a yoke, its sides being joined at their rear mid portion by the cross-tie member 19, thereby making the sides integral. The bearing cap 17 is secured to the rocker bracket 15 by suitable fastening devices 20. The upper portions of the rocker bracket 15 are angularly disposed with relation to the crank shaft 13 and rigidly mounted therein is the shaft pin 21 upon which is rotatably mounted the forward actuating gear 22. Disposed in a similar manner below the crank shaft 13 is the shaft pin 23 and the reverse actuating gear 24. The teeth of the actuating gears 22 and 24 are in constant mesh with the driving gear 14. Extending integrally rearwardly from the cross-tie member 19 is the rocker centering arm 25.

The rocker bracket 15 is normally held in a neutral or disengaged position, as regards the actuating gears 22 and 24, by means of the rocker centering arm 25 engaging the plungers 26 and 27. The latter are oppositely mounted for limited axial movement in the centering bracket 28 which is attached to the frame 10 by suitable fastening devices 29. The plungers 26 and 27 are biased toward one another by the springs 30 and 31, and this bias is limited by reason of the shoulders 32 and 33 on the plungers 26 and 27 coming into engagement respectively with the oppositely disposed abutments 34 and 35 in the centering bracket 28. This limited movement of the plungers 26 and 27 is such that the inner ends of the plungers are normally in spaced relation one to the other a distance equal to the depth of the end of the centering arm 25 with which they are engaged. The bias of the plungers 26 and 27 is of sufficient strength to overcome the frictional resistances of the gear train plus the unbalanced weight of the assembled rocker bracket 15, and to maintain the latter in its normal disengaged position, except when the auxiliary propulsion motor is supplied with power and the rocker bracket 15 functions as will hereinafter be described. Relief openings 36 and 37 are provided leading into the spring cavities so as to eliminate any effects on the plungers 26 and 27 due to the compression of rarefication of the enclosed air upon the functioning of the plungers.

Figure 2:
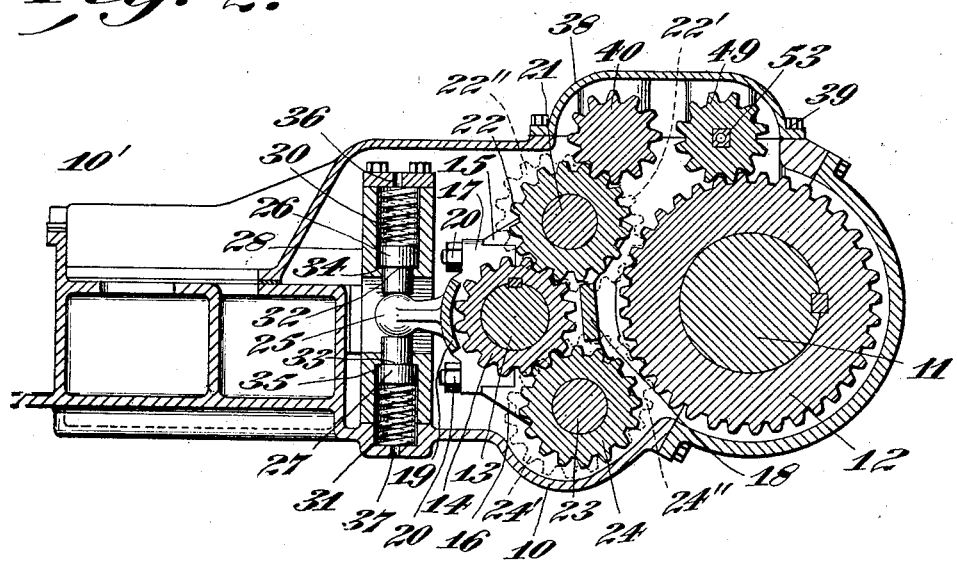
Fig. 2 is a longitudinal sectional elevation through the driving and driven gears, and a pair of the synchronizing gears, taken along the line 2—2 of Fig. 3.

Referring now to Figs. 1 and 2 we have provided a cover plate 38 attached to the top of the frame cover 10' by suitable fastening means 39. Mounted within this cover plate 38 are the parts shown in cross section in Fig. 3, which we choose to designate as the driven and driving transmission gear trains, together with the transmission clutch details which we will now describe. The driving transmission gear train comprises the actuating gear idler gear 40 in constant tooth engagement with the actuating gear 22, the idler gear 41 and the gear 40 integrally mounted on the same axis, and the clutch gear 42. The integral gears 40 and 41 have shaft ends 43 and 44 rotatably mounted respectively in the fixed bearings 45 and 46, and, being integral, the gears 40 and 41 of course rotate as one therein. The clutch gear 42 is in constant tooth engagement with the idler gear 41, and is rotatably mounted upon the fixed bearings 47 and 48, and both gears are so disposed as to be free of contact or engagement with either the axle gear 12 or the actuating gear 22. The driven transmission gear train comprises the driven idler gear 49. The gear 49 is in constant tooth engagement with the driven axle gear 12, and is fixed upon clutch shaft 50 which in turn is rotatably and slidably axially mounted within the fixed bearings 51, 47, and 48. The fixed bearings 45, 46, 47, 48, and 51 are similarly mounted in the cover plate 38 by means of conventional type split bearing caps 52.

For fixing the gear 49 upon the clutch shaft 50 we prefer to have it engage a squared portion of the shaft as shown in Fig. 2 at 53 which fixes it as regards relative rotational movement, while for fixing the gear 49 axially upon the shaft 50 we reduce the diameter within the region of the fixed bearing 51 to within the limits of the squared portion 53 and upon this reduced diameter we press a bushing 54 with an outer diameter suitable for rotation within the fixed bearing 51; then by means of a threaded end portion 55 and a nut 56 the bushing 54 and the gear 49 are fixed axially by clamping between the inner face of the nut, when screwed in place, and the abutment faces 57 resulting from the squared portion 53.

As noted above the clutch shaft 50 is rotatably and axially slidably mounted within the fixed bearings 51, 47, and 48. Since the bushing 54 and the gear 49 act integrally with the shaft 50, the axial movement is provided for in the use of the bushing 54 by making it somewhat greater in length than the sum of the predetermined axial movement of the shaft 50 plus the length of the fixed bearing 51, thus assuring a full bearing on the bushing 54 for any axial position of the shaft 50. The gear 49 though in constant tooth engagement with the gear 12 is free to move longitudinally without affecting this tooth engagement due to the parallel tooth arrangement and the considerably greater width of the gear 12 over that of the sliding gear 49. We have chosen to allow the gear 49 to limit the axial movement of the shaft 50, which we do by making the spaced relation between adjacent ends of the fixed bearings 47, and 51, and between which the gear 49 moves axially, equal to the sum of the predetermined axial movement of the shaft 50 and the thickness of the gear 49. The normal position of the shaft 50 is that in which the gear 49 is intermediate of the limiting faces of the fixed bearings 47 and 51, and corresponds to that shown in Fig. 3. For maintaining the shaft and gear normally in this position a biased centering device is provided. The shaft 50 has the bore 58 extending along its axis from one end to the internal shoulder 59, from which point a reduced diameter of bore 60 extends to the opposite end. On the shaft 50 at the end containing the bore 58 is mounted a threaded cap 61 having a bore 62 along the extension of the axis of the shaft 50. Slidably mounted within the bore 58 is the plunger 63 having a reduced portion 64 extending outward through the bore 62 of the cap 61. The outer end of the reduced portion 64 of the plunger 63 normally engages a conventional type end thrust bearing 65 operably mounted between the frame cover 10' and the cover plate 38. The end thrust bearing 65 is held in place by a plate 66 suitably attached to the frame cover 10'.

The plunger 63, due to the reduced portion 64, has the shoulder 67, the abutment face of which is normally in engagement with the inner abutment face of the cap 61. Slidably mounted within the bore 60 is the plunger 68. The plunger 68 has an enlarged portion 69 extending within the bore 58. The plunger 68 due to its enlarged portion 69 has the shoulder 70, the abutment face of which is normally in engagement with the abutment face of the shoulder 59. The plunger 68 extends beyond the outer end of the bore 60 and engages normally a conventional type end thrust bearing 71 operably mounted between the frame cover 10' and the cover plate 38. The end thrust bearing 71 is similar in function and its mountings to the bearing 65 described hereinbefore. A spring 72 is placed within the bore 58 in coacting engagement with the opposed inner faces of the plungers 63 and 68. The spring 72 functions to tend to hold the plungers 63 and 68 in their respective normal position, but yieldingly permits of axial movement of the shaft 50 in either direction. When the shaft 50 moves axially, it moves relatively to that plunger (63 or 68) toward which its movement takes place and the resulting thrust upon the plunger by the spring 72 is taken by the respective thrust bearing (65 or 71), while the other plunger (63 or 68) maintains its relative position with the shaft 50 and moves in unison therewith away from its normally coacting thrust bearing (65 or 71).

Fixed in place upon the outer end of the shaft 50 by means of the threaded cap 61 is the conventional type double thrust bearing 73. This type of bearing is so well known that it will be unnecessary to describe it further than to say that it comprises a non-rotating outer member 74 which permits of end thrusts in either axial direction, and an inner member 75 fixed upon (by the clamping action of the cap 61) and rotatable with the shaft 50. The bearing member 74 has suitably fastened at opposite points on its periphery the gudgeon pins 76 (shown in Fig. 6) threaded on their outer ends for the nuts 77. The gudgeon pins 76 engage slots 78 in the clutch operating fork 79 rotatably mounted on pin 80 (Figs. 1 and 3) which in turn is fixed in the cover 38. The clutch operating fork 79 has the extension 81 in operable engagement with the functioning element 82 within the motor 83. We have here shown, and prefer to use, a compressed air motor as the preferred type of motor 83, having a slidable piston as the functioning element 82, but we do not wish to be confined to this type of motor since it is apparent that any motor capable of elective operation that would give a yieldable rocking motion to the fork 79 would be suitable for this particular function. Such other suitable motor types might be hydraulic, or electric of the solenoid type. The motor 83 as shown is fixed to the cover 38 by suitable means 84, and has at each end closure means 85. Communicating with the motor interiors are the passageways 86 and 87 which in turn communicate with a source of controlled fluid power not shown.

We now return to the clutch gear 42 and the clutch shaft 50 shown in Fig. 3 and in part detail in Fig. 4. The clutch gear 42 comprises the gear half 88 and the cover half 89 made integral by the suitable securing means 90. The hub of the gear half 88 is rotatably mounted upon the fixed bearing 47, while the hub of the cover half 89 is rotatably mounted on the fixed bearing 48; the two halves of course rotate as a unit. The gear half 88 is counter bored at 91 to form the shoulder surface 92 which is machined to form radial clutch teeth 93 having axial radial abutment faces 94 and angularly disposed abutment faces 95. The cover half 89 has the inner facial surface 96 machined to form radial clutch teeth 97 having axial radial abutment faces 98 and angularly disposed abutment faces 99. The abutment faces 94 and 95 are parallel to but opposed in direction to the abutment faces 98 and 99 respectively. The clutch shaft 50 is machined with a clutch disc portion 100 to form facial surfaces 101 and 102. The facial surface 101 is machined to form radial clutch teeth 103 having axial radial abutment faces 104 and angularly disposed abutment faces 105. The facial surface 102 is machined to form radial clutch teeth 106 having axial radial abutment faces 107 and angularly disposed abutment faces 108. The abutment faces 104 and 105 are parallel to but opposed in direction to the abutment faces 107 and 108 respectively. Also the abutment faces 104 and 105 are parallel to but opposed in direction to the abutment faces 94 and 95 respectively, while the abutment faces 107 and 108 are parallel but opposed in direction to the abutment faces 98 and 99 respectively.

The faces 92 and 101, and 96 and 102, are in such spaced relation respectively, that normally the clutch disc 100 may have relative rotational movement without engagement with either the gear half 88 or the cover half 89, and, moreover, the depth of the teeth 93, 103, 106, and 97 is such that they permit of axial movement in either direction equal to the permissible axial movement of the shaft 50 in either direction. However, when such axial movement of the clutch shaft 50 takes place it is readily seen that the clutch shaft 50 is either effectively or ineffectively engaged with either the gear half 88 or the cover half 89, depending upon the direction of axial movement and the direction of relative rotational movement of the parts under discussion. The functional relation of these parts will be more fully described hereinafter.

The gearing as a whole is enclosed within the suitable housing or frame 10, which is adapted to contain a bath of lubricating oil whereby all of the parts will be automatically lubricated.

Referring now to Figs. 1 and 2 of the drawings, it will be observed that when the reversible propulsion motor is not in driving engagement with axle 11, the rocker bracket 15 and the forward and reverse actuating gears 22 and 24 are in their disengaged position as shown in full lines. Also, reference to Fig. 3 will show the clutch disc 100 in its disengaged position with the gear 42. For the purpose of this description we will assume that forward propulsion of the auxiliary locomotive results in clockwise rotation of the axle 11, and that reverse propulsion therefore results in anti-clockwise rotation of the axle 11. By reason of the intermediate actuating gears 22 and 24 it is readily seen that forward propulsion requires clockwise rotation of the driving gear 14, while reverse propulsion requires anti-clockwise rotation of the same gear. Since the actuating gears 22 and 24 are in constant meshed relation with the driving gear 14 it is seen that their direction of rotation is always opposite that of the driving gear 14. The gear 40 by reason of its constant meshed relation with the gear 22 is always in uniform direction of rotation with the driving gear 14, and by reason of its integral attachment the gear 41 rotates as does the gear 40. The gear 42 being in constant mesh with 41 always rotates oppositely to the driving gear 14. The gear 49 being in constant mesh with the axle gear 12 always rotates oppositely to the axle 11. From this arrangement of the gears it is now seen that effective clutch engagement of the gear 42 with the clutch shaft 50 for forward operation of the driving gear 14 is brought about by bringing the clutch teeth faces 98 into engagement with the clutch teeth faces 107. This condition is brought about by communicating the passageway 86 to a source of fluid power which results in a clockwise partial rotation of the clutch operating fork 79 as seen in Fig. 3, thereby shifting the clutch shaft 50 with its integral disc 100 to the right as seen in Figs. 3 and 4. For reverse operation of the driving gear 14, effective clutch engagement of the gear 42 with the clutch shaft 50 is brought about by bringing the clutch teeth faces 94 into engagement with the clutch teeth 104. This is done by communicating the passageway 87 to a source of fluid power which results in an anti-clockwise partial rotation of the clutch operating fork 79 as seen in Fig. 3, thereby shifting the clutch shaft 50 with its integral disc 100 to the left as seen in Figs. 3 and 4.

Effective engagement of the gear 42 with the clutch shaft 50 can only occur when the gear 42 tends to rotate faster than the clutch shaft 50. Ineffective engagement of the gear 42 with the clutch shaft 50 can properly occur when the axle 11 is already under rotation at the time the clutch 50 is functioned. In this case the clutch disc 100 will be rotating faster than the gear 42 and will slip into and out of engagement due to the angularly disposed clutch teeth faces 99 and 108 or 95 and 105 coming into engagement.

Effective engagement of the gear 42 with the clutch shaft 50, in either direction of rotation of the driving gear 14, results in establishing a train of gears from the driving gear 14 to the driven gear 12, in which train of gears all the gears intermediate the driving gear 14 and the driven gear 12 function as idler gears, with the result that the peripheral speed of the gear tooth circles of each of the gears 14, 22, 24, and 12 is identical. We have also shown that the gears 22 and 24 always rotate oppositely to the gear 12; and this results in the fact that if gear tooth engagement of either of the gears 22 and 24 is made with the gear 12, that the gear tooth peripheries have the same tangential direction of motion. The facts that the gear tooth peripheries at their point of possible engagement have the same tangential direction of motion, and that their peripheral speeds are identical, makes possible speed synchronized tooth engagement. By properly timing the effective clutch relation of the clutch disc 100 with the gear 42 we get possible isochronized tooth space engagement. Synchronized speed with isochronized tooth space engagement is ideal in that it permits of positive non-clashing of the gears in making engagement.

In order to properly time the relation of the clutch 100 with the gear 42 so that any point in their pick-up will give a definite angular relation between the teeth on the gears 22 and 24 and 12 at their point of engagement, we make the gear ratio of the gears 40 and 49 and of the gears 41 and 42 one to one, and we also make the angular space between consecutive teeth on the clutch members equal to, or an integral multiple of, the angular space between consecutive teeth on the gears 40 and 49.

When steam or other motive agent is supplied to the auxiliary reversible propulsion motor for forward propulsion, rotation is transmitted through the crank shaft 13 and the train of gears 14, 24, 22, 40, 41, and 42 rotate in direction as hereinbefore described. If in this condition the clutch shaft 50 is left in its disengaged position, by refraining from functioning the motor 83, then the gears 14, 24, 22, 40, 41, and 42 rotate freely about their respective axes and no power is transmitted to the axle 11. The same holds true if the propulsion motor is operated for reverse propulsion, the gears 14, 24, 22, 40, 41, and 42 rotating as hereinbefore described for reverse propulsion. This is a valuable feature of our design in that it permits idling of the auxiliary reversible propulsion motor for the purpose of testing, inspection, warming-up, or other desired operation with non-transmission of power to the axle 11.

In order to engage the auxiliary reversible propulsion motor for effective transmission of power to the axle 11 it is necessary to effectively engage the gear 42 with the clutch shaft 50 for the proper direction of propulsion as hereinbefore described. This is preferably done simultaneously with the supplying of the auxiliary reversible propulsion motor with power, except when idling the reversible propulsion unit described above. It may be done while the axle 11 is at a standstill or while rotating in the proper direction for which additional power is required. In any of these events the relative action of the gear train after rotation of the gear 14 starts is the same, which is as follows: The motor 83 properly functioned acts upon the clutch fork 79 and this actuates the clutch shaft 50 in the proper direction, thus bringing the clutch disc 100 into lateral engagement with the gear 42, upon which the gears continuing to rotate, the clutch disc 100 becomes effectively engaged with the gear 42. Up to this point the gears 14, 24, 22, 40, 41, and 42 have rotated freely without effecting the rocker 15, but at the instant of effective engagement of the shaft 50 with the gear 42 the gear 49 and the gear 12 become part of the rotating train of gears and it is apparent that there must be immediate mutual adjustment of the peripheral speeds of the driving gear 14 and that of the driven gear 12. For the purpose of description the axle 11 together with the gears 12 and 49 may be considered as at a standstill at the instant of engagement of the shaft 50 with the gear 42. The above mentioned engagement therefore tends to bring the gears 42, 41, and 40 to a standstill since they are mounted on fixed axes and have no alternative but to act in conjunction with the gears 12 and 49. However, since the gear 22 is mounted in the rocker 15 in planetary relation to the driving gear 14, it is also subject to translation in relation to the gear 40. When, therefore, the gear 22 is rotated by the driving gear 14 and resistance to motion is offered by the gear 40, the gear 22 will be rolled, as it were, upon the gear 40 resulting in a rocking of the rocker 15 in that direction in which the driving gear 14 is rotating. If the driving gear 14 is operated for forward propulsion it rotates clockwise, as hereinbefore described, and the gears 22 and 24 will assume their position as shown in dotted lines as at 22′ and 24′ in Fig. 2. In reverse propulsion the gears 22 and 24 assume their position as shown in dotted lines as at 22″ and 24'' in Fig. 2. It should be noted that although the gear 22 is moved translationally relative to the gear 40, such translational movement is relatively small and the gears 22 and 40 are never operatively disengaged. Also the load transmitted by the gear 40 is so relatively light and of such short duration that although the pitch circles of the two gears 22 and 40 are not always in their theoretical proper relation yet the gears 22 and 40 are operatively effective at all times without undue wear. When this rocking of the rocker 15 takes place, the centering arm 25 overcomes the resistance offered by the plunger (26 or 27) against which it presses and the rocker 15 rotates until limited by the abutment 109 on the rocker 15 engaging the abutment 110 on the frame 10, or the abutment 111 on the rocker 15 engaging the abutment 112 on the frame 10, depending upon in which direction the gear 14 is rotating. When the abutment 109 is in engagement with the abutment 110 the gear 22 is in full meshed engagement for forward propulsion with the gear 12, and when the abutment 111 is in engagement with the abutment 112 the gear 24 is in full meshed engagement for reverse propulsion with the gear 12. Although there is an actual relative rotation of the gears 22 or 24 about their axes in rolling into engagement with the gear 12, this rotation relative to the gear 12 is practically zero, since the path of translation of the gears 22 or 24, at the point of engagement, when moving into engagement with the gear 12 is opposite that of the rotation. Furthermore, the very first movement of the driving gear 14 in going into operation, with the axle 11 at a standstill, results in the engagement of either the gear 22 or the gear 24 with the axle gear 12 substantially before speed has picked up. When the axle 11 is rotating at the time the driving gear 14 is put into operation, as hereinbefore described, there can be no effective engagement of the clutch shaft 50 with the gear 42 until the speed of the gear 42 begins to exceed that of the clutch shaft 50; and until such effective engagement takes place there is no resistance offered to the rotation of the gears 14, 24, 22, 40, 41, and 42, and therefore there is no movement of the rocker 15 to engage either of the gears 22 or 24 with the gear 12. However, at the instant when the peripheral speed of the driving gear 14 exceeds or passes that of the rotating driven gear 12 the engagement of either the gear 22 or 24 with the gear 12 is immediately effected. Thus it is seen that our device provides means for engaging a driving gear member with a driven gear member synchronized as regards speed and isochronized as regards tooth space engagement.

It would be very undesirable, due to their comparatively weak design, to have the transmission gears 40, 41, 42, and 49 transmit any considerable power to the axle 11, and such is not their purpose. Our design is such that these gears transmit power only to function the engagement of the gears 22 or 24 with the axle gear 12, and at the instant of engagement of either the gear 22 or 24 with the gear 12 the clutch shaft 50 is disengaged from the gear 42 and the clutch becomes ineffective. We have just described above the engagement action of the gears 22 or 24 with gear 12 as regards the rotation, due to rolling into engagement, of the gear 22 or 24 as being practically compensated for by the translational movement of the gears 22 or 24 when going into full engagement with the gear 12. However, the action of the gear 22 upon the gear 40 due to its translational movement is nearly tangential and this results in a rotational movement of the gear 40 which is a decrement to that received from the driving gear 14. In other words it is negative in effect in that it is opposite to the direction of driving rotation. The result is that when the gears 22 or 24 have made tooth contact with the gear 12 at some point before complete engagement they transmit to the gear 12 rotation that is directly proportional to their diameters, but they transmit to the gear 40 rotation that is directly proportional to their diameters less an angular amount due to the translational effect of the gear 22 in completing engagement with the gear 40. The effect of this is that the angular movement transmitted by the gears 40, 41, and 42 is less than that received by the gear 49 and this results in breaking the effective engagement of the clutch shaft 50 with the gear 42, and maintaining it disengaged as long as the gear 22 or 24 is engaged with the gear 12.

Immediately upon the engaging of the driving gear 14 with the axle gear 12 through the medium of the gear 22 or 24, a positive power driving impulse is transmitted to the axle 11 whereby the movement of the train will be appreciably accelerated. When the movement of the train has reached a speed of about 15 miles per hour and the aid of the auxiliary reversible propulsion unit is no longer desired or necessary, the supply of steam or other motive agent to the said unit is cut off, and at the same time the supply of fluid power to the motor 83 is shut off and released. Shutting off the motive agent to the propulsion unit discontinues further rotation of the crank shaft 13, while shutting off and releasing the supply of fluid power to the motor 83 disengages the clutch shaft 50 from the gear 42 by reason of the centering action of the spring 72. Inasmuch as the sustained engagement of the actuating gear 22 or 24 with the gear 12 is dependent upon the continuous driving effort of the auxiliary reversible propulsion unit, disengagement of these gears will take place when the motive agent to the auxiliary reversible propulsion unit is cut off, because of the action of the centering plunger 26 or 27 tending to rotate the rocker bracket 15 and return it to its normal disengaged position. The disengagement is also assisted by the action of the gear 12 which has the normal tendency to force the gear 22 or 24, as the case may be, out of meshing engagement when the power is shut off. Thus the disentrainment of the driving shaft 13 from the axle 11 is instantaneously automatic when the propulsion unit is cut out.

To those skilled in the art it will be apparent that our device is readily adaptable for one-way type of auxiliary locomotives, or the like, and that in this case considerable economies may be made by leaving out those details of design that function only in the reverse direction to that chosen for use. In Fig. 5 we have shown a portion of such a design to show the possibility of such economies. When considered in connection with the foregoing description and the accompanying drawings, further description of this modification will be unnecessary other than to point out that the spring 113 in its reaction against the piston 114 limited by the stop 115 functions to hold the clutch shaft 116 in its normal disengaged position much in the same manner as did the spring 72 with its co-operating parts shown in Fig. 3.

Also to those skilled in the art it will be apparent that the clutch means with its accompanying operating parts will function in a similar manner if applied in connection with the gears 40 and 41 instead of the gears 42 and 49.

While we have shown our invention in a plurality of forms, it will be obvious to those skilled in the art that it is not so limited, but is susceptible of other changes and modifications without departing from the spirit thereof and we desire, therefore, that only such limitations shall be placed thereupon, as are imposed by the prior art, or as are specifically set forth in the appended claims.

Having thus described our invention what we claim as new and desire to secure by Letters Patent is:

1. In an entraining mechanism, a driven gear, a driving train including an actuating gear which is normally out of engagement with the driven gear, means effective upon operation of the driving train to bring the actuating and the driven gears into engagement, means to render ineffective the first mentioned means, and means to assure an isochronous relation of teeth and tooth spaces between the actuating gear and the driven gear at the point of engagement.

2. In an entraining mechanism, a driven gear, a driving train including an actuating gear which is normally out of engagement with the driven gear, means actuated by the driving train for automatically bringing the actuating and driven gears into engagement, means to render ineffective the foregoing means, and means actuated by the driving train to assure an isochronous relation of the teeth of the actuating gear with the tooth spaces of the driven gear at the point of engagement.

3. In an entraining mechanism, a driven gear, a driving train including an actuating gear which is normally out of engagement with the driven gear, means actuated by the driving train for automatically bringing the actuating and driven gears into predetermined isochronous engagement, and means to render ineffective the first mentioned means.

4. In an entraining mechanism, a driven gear, a driving train including an actuating gear which is normally out of engagement with the driven gear, means actuated by the driving train for automatically bringing the tooth peripheries of the actuating and driven gears into a predetermined engaging relation, means actuated by the driving train for automatically bringing the actuating and driven gears into engagement, and means to render ineffective the first mentioned and the second mentioned means.

5. In a reversible entraining mechanism, a driven gear, a driving train including a forward actuating gear and a reverse actuating gear which are normally out of engagement with the driven gear, means to predetermine the actuating gear to be engaged, means effective upon operation of the driving train to automatically bring the predetermined actuating gear and the driven gear into engagement, means to render ineffective the latter means, and means to assure an isochronous relation of the teeth of the predetermined actuating gear with the tooth spaces of the driven gear at the point of engagement.

6. In an entraining mechanism, a driving train including an actuating gear, a driven train including a driven gear, said gears being normally out of engagement with each other, means responsive to the operation of the driving train to engage an element of the driven train and thereby produce a reaction between the driving train and the driven train to move the actuating and driven gears into mesh, and means to electively prevent functioning of the first mentioned means.

7. In an entraining mechanism, a driving train including an actuating gear, a driven train including a driven gear, said gears being mounted to permit of relative movement to and from meshing engagement, means responsive to the operation of the driving mechanism to effect a reaction between the driving train and the driven train effective to move the actuating and driven gears into engagement, and means to electively render ineffective the first mentioned means.

8. In an entraining mechanism, a driving train including an actuating gear, a driven train including a driven gear, said gears being mounted to permit of relative movement to and from meshing engagement, means actuated by the driving train engageable with the driven train to exert a torque thereon effective as the result of the resistance of the driven train to move the actuating and driven gears into meshing engagement, and means to prevent the production of said torque.

9. In an entrainment mechanism, a driving train including an actuating gear, a driven train including a driven gear, said gears being mounted to permit of relative movement to and from engagement, a transmission train driven by said driving train, means to bring the transmission train into torque exerting engagement with the driven train, said transmission train being operatively connected to said gears to move them into engagement as a result of the resistance of said driven train to said torque, and means to prevent bringing the transmission train into torque exerting engagement with the driving train.

10. In an entrainment mechanism, a driving train including an actuating gear, a driven train including a driven gear, said gears being mounted to permit of relative movement to and from engagement, a transmission train driven by said driving train, means actuated by the operation of said transmission train to bring said transmission train into torque exerting engagement with the driven train, said transmission train adapted to being operatively connected to said gears to move them into engagement as a result of the resistance of said driven train to said torque, and means to prevent bringing the transmission train into torque exerting engagement with the driving train.

11. In an entrainment mechanism, a driving train including an actuating gear, a driven train including a driven gear, said gears being mounted to permit of relative movement to and from engagement, a transmission train driven by said driving train, means to bring the transmission train into torque exerting engagement with the driven train, said transmission train adapted to being operatively connected to said gears to move them into partial meshing engagement as a result of the resistance of said driven train to said torque, means to bring said gears into complete meshing engagement and to break the torque exerting engagement of said transmission and driven trains, and elective means independent of the operation of the driven train to render said transmission train effective or ineffective.

12. In an entrainment mechanism, a driving train including an actuating gear, a driven train including a driven gear, said gears being mounted to permit of relative movement to and from engagement, means adapted to be operated by the driving train engageable with the driven train to exert a torque thereon, means to move said gears into meshing engagement as a result of the resistance of the driven train to said torque, and elective means independent of the operation of the driven train to render effective or ineffective the first mentioned means.

13. In an entrainment mechanism, a driving train including an actuating gear, a driven train including a driven gear, said gears being mounted to permit of relative movement to and from engagement, means adapted to be operated by the driving train engageable with the driven train to exert a torque thereon, means to move said gears into partial meshing engagement as a result of the resistance of the driven train to said torque, means effective as a result of the resistance to turning of said driven train to complete the meshing engagement of said gears and to break said torque exerting engagement, and elective means independent of the operation of the driven train to render effective or ineffective the first mentioned means.

14. In an entrainment mechanism, a driving train including an actuating gear, a driven train including a driven gear, said gears being mounted to permit of relative movement to and from engagement, a transmission train driven by said driving train, means to bring the transmission train into torque exerting engagement with the driven train, said transmission train adapted to being operatively connected to said gears to move them into engagement as a result of the resistance of said driven train to said torque, elective means independent of the operation of the driven train to render said transmission train effective or ineffective, and means exerting a force tending to disengage said gears.

15. In an entrainment mechanism, a driving train including an actuating gear, a driven train including a driven gear, said gears being mounted to permit of relative movement to and from engagement, a transmission train driven by said driving train, means to bring the transmission train into torque exerting engagement with the driven train, said transmission train adapted to being operatively connected to said gears to move them into partial meshing engagement as a result of the resistance of said driven train to said torque, means to bring the said gear into complete meshing engagement and to break the torque exerting engagement of said transmission and driven trains, elective means independent of the operation of the driven train to render said transmission train effective or ineffective, and means exerting a force tending to disengage said gears.

16. In an entrainment mechanism, a driving train including an actuating gear, a driven train including a driven gear, said gears being mounted to permit of relative movement to and from engagement, a transmission train driven by said driving train, means to bring the transmission train into torque exerting engagement with the driven train, said transmission train adapted to being operatively connected to said gears to move them into partial meshing engagement as a result of the resistance of said driven train to said torque, means to bring said gears into complete meshing engagement, means effective as a result of the complete meshing engagement of said gears to break the torque exerting engagement of said transmission and driven trains, and elective means independent of the operation of the driven train to render said transmission train effective or ineffective.

17. In an entrainment mechanism, a driving train including an actuating gear, a driven train including a driven gear, said gears being mounted to permit of relative movement to and from engagement, a transmission train driven by said driving train, means to bring the transmission train into engagement with the driven train to establish a definite meshing relationship between said gears, means actuated by said driving means to bring said gears into meshing engagement, and elective means independent of the operation of the driven train to render the aforesaid means effective or ineffective.

18. In an entraining mechanism, a driving train including an actuating gear, a driven train including a driven gear, said gears normally being out of engagement with each other, means adapted to be actuated by the operation of the driving train to lock the driving train to the driven train to establish a definite meshing relationship between the actuating and driven gears, means adapted to be actuated by the driving mechanism to effect partial engagement between the actuating and the driven gears, means to complete the meshing engagement of said gears and to break the locking relationship between the driving train and the driven train, and elective means independent of the operation of the driven train to render the aforesaid means effective or ineffective.

19. In an entrainment mechanism, a driving shaft having a driving gear, a driven gear, a rocker member mounted upon said shaft and carrying an actuating gear constantly engaged with said driving gear but normally out of engagement with the driven gear, means including auxiliary gear members adapted to be driven by said shaft and so related to said driven and actuating gears that upon rotation of said shaft the meshing relation of the teeth of the said driven and actuating gears will be established and cause the said actuating gear to be moved from its normally spaced position into driving engagement with said driven gear, and elective means independent of the operation of the driven train to render the aforesaid means effective or ineffective.

20. In an entrainment mechanism, a driving train including an actuating gear, a driven train including a driven gear, said gears being normally disengaged and adapted for independent rotation but so mounted as to permit of relative movement to and from engagement, a transmission train driven by the actuating gear, a transmission train driven by the driven gear, the first mentioned transmission train being normally out of engagement with the second mentioned transmission train, engaging means adapted to operatively engage the said transmission trains whereby when the first mentioned transmission train is actuated by the actuating gear the actuating gear moves into engagement with the driven gear as a result of the resistance of said driven gear to torque from the actuating gear, and control means adapted to electively control said engaging means.

21. In an entrainment mechanism, a driving shaft having a driving gear, a driven shaft including a driven gear, a rocker member mounted about said driving shaft carrying an actuating gear in constant mesh with said driving gear but normally out of engagement with said driven gear, a transmission train driven by the actuating gear, a transmission train driven by the driven gear, a clutch device normally disengaged but adapted to operatively connect the first mentioned transmission train to the second transmission train, and means electively operable to engage the clutch device, whereby the rotation of the driving shaft will cause the clutch device to operatively connect the first mentioned transmission train to the second transmission train and thereby establish the meshing relation of the teeth of the driven gear and the actuating gear and cause the actuating gear to be moved from its normally disengaged position into driving engagement with the driven gear.

22. In an entrainment mechanism, a driving shaft having a driving gear, a driven shaft including a driven gear, a rocker member mounted about said driving shaft carrying an actuating gear in constant mesh with said driving gear but normally out of engagement with said driven gear, a transmission train driven by the actuating gear including a clutch member, a transmission train driven by the driven gear including an operable clutch member normally disengaged from the first mentioned clutch member, means adapted to position the operable clutch member for effective engagement with the first mentioned clutch member, and means adapted upon rotation of the driving shaft to operate the first mentioned clutch member for effective engagement with the second mentioned clutch member to establish a definite meshing relationship of said actuating gear and said driven gear, whereby the clashing of said actuating gear and said driven gear is prevented upon their engagement.

23. In an entrainment mechanism, a driving shaft having a driving gear, a driven shaft including a driven gear, a rocker member mounted about said driving shaft carrying an actuating gear in constant mesh with said driving gear but normally out of engagement with said driven gear, a transmission train driven by the actuating gear including a clutch member, a transmission train driven by the driven gear including a clutch member normally disengaged from the first mentioned clutch member, means adapted to position the clutch members for effective engagement which upon rotation of the driving shaft will establish a definite meshing relationship of said actuating gear and said driven gear, whereby the clashing of said actuating gear and said driven gear is prevented upon their engagement, and means adapted to position the clutch members for ineffective engagement, whereby the rotation of the driving shaft will be ineffective to cause engagement of the actuating gear with the driven gear.

24. In an entrainment mechanism, a driving shaft having a driving gear, a driven shaft including a driven gear, a supporting frame for said shafts, a rocker member mounted about the driving shaft carrying an actuating gear in constant mesh with the driving gear but normally out of engagement with the driven gear, an auxiliary gear train mounted in the supporting frame in constant mesh with the actuating gear, a second auxiliary gear train mounted in the supporting frame in constant mesh with the driven gear, a clutch device normally disengaged but adapted to operatively connect the first mentioned auxiliary gear train to the second mentioned auxiliary gear train, and means electively operable to engage the clutch device, whereby the rotation of the driving shaft will cause the clutch device to operatively connect the first mentioned auxiliary gear train to the second mentioned auxiliary gear train and thereby establish the meshing relation of the teeth of the driven and actuating gears and cause the actuating gear to be moved from its normally disengaged position into driving engagement with the driven gear.

25. In an entrainment mechanism, a driving shaft having a driven gear, a driven shaft including a driven gear, a supporting frame for said shafts, a rocker member mounted about the driving shaft carrying an actuating gear in constant mesh with the driving gear but normally out of engagement with the driven gear, an auxiliary gear train mounted in the supporting frame in constant mesh with the actuating gear, a second auxiliary gear train mounted in the supporting frame in constant mesh with the driven gear, a clutch means comprising two relatively engageable members normally disengaged but adapted to operatively connect the first mentioned auxiliary gear train to the second mentioned auxiliary gear train, a motor means adapted to move the engaging member of the clutch means into or out of engagement with the other clutch member, and means effective upon the engagement of the clutch means whereby the rotation of the driving shaft will first establish a definite meshing relationship of the actuating gear with the driven gear and then act to bring about their engagement without clashing.

26. In an entrainment mechanism, a driving shaft having a driven gear, a driven shaft including a driven gear, a supporting frame for said shafts, a rocker member mounted about the driving shaft carrying an actuating gear in constant mesh with the driving gear but normally out of engagement with the driven gear, an auxiliary gear train mounted in the supporting frame in constant mesh with the actuating gear, a second auxiliary gear train mounted in the supporting frame in constant mesh with the driven gear, a clutch means comprising two relatively engageable members normally disengaged but adapted to operatively connect the first mentioned auxiliary gear train to the second mentioned auxiliary gear train, a motor means adapted to move the engaging member of the clutch means into or out of engagement with the other clutch member, means effective upon the engagement of the clutch means whereby the rotation of the driving shaft will first establish a definite meshing relationship of the actuating gear with the driven gear and then act to bring about their engagement without clashing, and means adapted to disengage the actuating gear from the driven gear upon the removal of the driving force from the driving shaft.

27. In an entrainment mechanism, a driving shaft having a driven gear, a driven shaft including a driven gear, a supporting frame for said shafts, a rocker member mounted about the driving shaft carrying an actuating gear in constant mesh with the driving gear but normally out of engagement with the driven gear, an auxiliary gear train mounted in the supporting frame in constant mesh with the actuating gear, a second auxiliary gear train mounted in the supporting frame in constant mesh with the driven gear, a clutch means comprising two relatively engageable members normally disengaged but adapted to operatively connect the first mentioned auxiliary gear train to the second mentioned auxiliary gear train, a motor means adapted to move the engaging member of the clutch means into or out of engagement with the other clutch member, means effective upon the engagement of the clutch means whereby the initial rotation of the driving shaft will establish a definite meshing relationship of the actuating gear with the driven gear and cause said actuating gear to be moved from its normally spaced position into initial partial meshing engagement with the driven gear, and means effective upon further rotation of the driving shaft to effect the full meshing relation of the gears and to render ineffective the clutch means.

28. In an entrainment mechanism comprising disengaged driving and driven shafts having gears fixedly secured thereto, a supporting frame for said shafts, an auxiliary gear train including a clutch means mounted in the supporting frame adapted to operatively connect the driving shaft to the driven shaft by the clutch means, the clutch means being normally disengaged whereby the driving shaft or the driven shaft may be rotated in either direction relatively to the other and independent of the other.

29. In an entrainment mechanism, a driving shaft having a driven gear, a driven shaft including a driven gear, a supporting frame and bearings for said shafts, a rocker member mounted about the driving shaft carrying an actuating gear in constant mesh with the driving gear but normally out of engagement with the driven gear, an auxiliary gear train mounted in the supporting frame in constant mesh with the actuating gear, a second auxiliary gear train mounted in the supporting frame in constant mesh with the driven gear, a clutch means comprising two relatively engageable members normally disengaged but adapted to operatively connect the first mentioned auxiliary gear train to the second mentioned auxiliary gear train, a motor means adapted to move the engaging member of the clutch means into or out of engagement with the other clutch member, means effective upon the engagement of the clutch means whereby rotation of the driving shaft will first establish a definite meshing relationship of the actuating gear with the driven gear, followed by a planetary movement of the actuating gear relative to the driving gear, will then move the actuating gear into definite meshing relation with the gear on the driven shaft, and subsequently disengage the engaging member of the clutch means from the other clutch member, and means for automatically operating upon removal of the driving force from the driving shaft to restore the rocker member and the actuating gear to their normal disengaged position and thereby disentrain the driving and driven shafts.

30. In an entraining mechanism comprising driving and driven shafts, a gear fixed on each of said shafts, a rocker member mounted about the driving shaft, an actuating gear carried by said rocker and constantly engaged with the gear on said driving shaft but normally disengaged from the gear on the driven shaft, communicating means between said driving shaft and said driven gear adapted to establish a fixed meshing relation between the teeth of said actuating gear and the teeth of said driven gear, whereby the rotation of the driving shaft will cause said actuating gear to be moved from its normally disengaged position into positive meshing engagement with said driven gear, means adapted to disengage said actuating gear from said driven gear upon the removal of the driving force from said driving shaft, and elective means to render the communicating means effective or ineffective.

In testimony whereof we hereunto affix our signatures.

ROBERT S. A. DOUGHERTY.
EARL J. MILLER.